United States Patent [19]

Mark

[11] 4,007,155
[45] Feb. 8, 1977

[54] FLAME RETARDANT POLYCARBONATE COMPOSITION

[75] Inventor: Victor Mark, Evansville, Ind.
[73] Assignee: General Electric Company, Pittsfield, Mass.
[22] Filed: Nov. 26, 1975
[21] Appl. No.: 635,731

Related U.S. Application Data

[63] Continuation-in-part of Ser. No. 429,645, Dec. 28, 1973, Pat. No. 3,931,100.

[52] U.S. Cl. .................................. 260/45.7 S
[51] Int. Cl.$^2$ ................................. C08L 69/00
[58] Field of Search ........................ 260/45.7 S

[56] References Cited
UNITED STATES PATENTS 3,775,367  11/1973  Nouverné .............. 260/45.9 R
3,931,100  1/1976  Mark .................... 260/45.7 S

*Primary Examiner*—M. J. Welsh
*Attorney, Agent, or Firm*—Donald M. Papuga; William F. Mufatti

[57] ABSTRACT

A flame retardant polycarbonate composition comprising in admixture an aromatic carbonate polymer and a flame retardant additive which may be the metal salts of aliphatic sulfonic acids. Also, included herein is a non-opaque flame retardant polycarbonate composition of an aromatic carbonate polymer and an additive which is a metal salt of aliphatic sulfonic acids; said aromatic carbonate polymer and additive having a refractive index in the range of 1.54 to 1.65.

9 Claims, No Drawings

FLAME RETARDANT POLYCARBONATE COMPOSITION

This application is a continuation-in-part application of patent application Ser. No. 429,645 filed Dec. 28, 1973, now U.S. Pat. No. 3,931,100, issued Jan. 6, 1976.

This invention is directed to a flame retardant polycarbonate composition and in particular an aromatic polycarbonate containing in admixture therewith an additive which may be the metal salt of an aliphatic sulfonic acid and mixtures thereof. Additionally, this invention is directed to a non-opaque flame retardant polycarbonate composition and in particular an aromatic polycarbonate containing in admixture therewith an additive which may be the metal salts of particular aliphatic sulfonic acids and mixtures thereof wherein said aromatic polycarbonate and additive have a refractive index in the range of 1.54 to 1.65 and articles therefrom.

BACKGROUND OF THE INVENTION

With the increasing concern for safety, there is a positive move toward providing safe materials for public and household use. One particular area of need is that of providing flame resistant or flame retardant products or flame retardant non-opaque products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

In many instances, it is desirable that articles produced from these fire retardant polycarbonate resins retain their non-opaque characteristics.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.001 to about 10 parts per hundred parts of aromatic polycarbonate. An aromatic polycarbonate can be made flame retardant while retaining its non-opaque characteristics by incorporating with the aromatic polycarbonate 0.001 to about 2.0 parts per hundred parts of the aforesaid additives.

The shaped article of the present invention is that comprising an aromatic carbonate polymer and from 0.001 to about 2.0 parts per hundred parts of aromatic carbonate polymer of an additive having the following formula:

wherein X is an electron withdrawing radical, M is a metal selected from the group consisting of alkali metals and alkaline earth metals, R' is an aryl radical of 1–2 aromatic rings, R is an aliphatic radical of 1–10 carbon atoms, n and m are integers of from 0–11, s is an integer of from 0–5 and p is an integer of from 1–4; or mixtures thereof with the proviso that when s is 0, R is an aliphatic radical of 2–10 carbon atoms and X is chlorine or bromine mixtures thereof wherein the shaped article has a refractive index in the range of 1.54 to 1.65. Particularly preferred shaped articles are in the form of a sheet and a pellet.

The refractive indices of the materials herein are determined by the immersion method as described in *Physical Methods of Organic Chemistry*, by Arnold Weissberger, Interscience Publishers, Volume II, 1960 (page 1433).

When the refractive index of the instant additives is in the range of the refractive index of the aromatic carbonate polymer, i.e., 1.54 to 1.65, the polycarbonate composition and shaped article produced therefrom is non-opaque. This means that it is able to transmit light and is from translucent to transparent. Depending upon how close the refractive index of the additive is to that of the polycarbonate, this will determine whether the resulting composition is transparent or translucent. If the additive at the concentration employed is partially or totally soluble in the polycarbonate polymer, the more transparent the composition and resulting article will be.

More specifically, the particular additive of this invention is the metal salt of substituted and unsubstituted aliphatic sulfonic acids and mixtures thereof. The metal salt employed in the practice of this invention is either the alkali metal or alkaline earth metal salt or mixtures of these metal salts. The metals of these groups are sodium, lithium, potassium, rubidium, cesium, beryllium, magnesium, calcium, strontium and barium.

The aliphatic sulfonic acids employed in the practice of this invention can be substituted or unsubstituted wherein the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, halo-, nitro-, trihalomethyl and cyano electron withdrawing radical or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (Pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

The metal salts of the aliphatic sulfonic acids have the following formula:

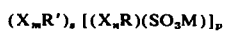   I.

wherein X is an electron withdrawing radical, M is a metal which may be selected from the periodic table of either an alkali metal or an alkaline earth metal, R' is an aryl radical of 1–2 aromatic rings, R is an aliphatic radical of 1–10 carbon atoms, n and m are integers of 0–11, $s$ is an integer of 0–5 and $p$ is an integer of 1–4 with the proviso that when $s$ is 0, R is an aliphatic radical of 2–10 carbon atoms and X is chlorine or bromine. As shown in the above Formula I, the aliphatic sulfonic acid may or may not have an electron withdrawing radical. Preferably, in the practice of this invention, the sulfonic acid should contain an electron withdrawing radical.

Actually, while there are many compounds that meet the requirements of Formula I and which offer excellent flame retardant characteristics to an aromatic polycarbonate, the preferred additives employed in the practice of this invention are:
Potassium 3,4-dichlorotoluene-α-sulfonate
Sodium 2-bromoethane-1-sulfonate
Potassium 2-chloroethane-1-sulfonate The compositions of the instant invention may contain fillers, pigments, dyes, antioxidants, stabilizers, ultraviolet light absorbers, mold release agents, etc. If a non-opaque flame retardant composition is desired, it may contain other additives commonly employed in non-opaque polycarbonate resin formulations. Furthermore, the shaped articles may be coated with, for example, mar or scratch-resistant coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

One hundred (100) parts of an aromatic polycarbonate, prepared by reacting 2,2-bis(4-hydroxyphenyl) propane and phosgene in the presence of an acid acceptor and a molecular weight regulator and having an intrinsic viscosity of 0.57 is mixed with 0.20 part of a finely ground dehydrated additive listed in Table I by tumbling the ingredients together in a laboratory tumbler. The resulting mixture is then fed to an extruder, which extruder is operated at about 265° C, and the extrudate is comminuted into pellets.

The pellets are then injection molded at about 315°C into test bars of about 5 in. by ½ in. by about one-sixteenth in. to one-eighth in. thick into test squares of about 2 in. by 2 in. by about one-eighth in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than one-eighth inch of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four are classified as V-0, then the rating for all five bars is V-II.

The test squares are tested for light transmission in a Gardner XL 10-CDM instrument. The data shows the amount of incident light transmitted by the test squares using air as 100% transmission.

The results of additives within the scope of the instant invention are as follows with a control being the aromatic polycarbonate as prepared above without the additive of the type set forth herein.

TABLE 1

| Additive (0.20 parts per hundred) | Light Transmission (%) | Flame Out Time Seconds | No. of Drips Per five test bars | UL-94 Rating |
|---|---|---|---|---|
| CONTROL | 86 | 38.9 | 14 | Burning |
| Potassium 3,4-dichlorotoluene-α-sulfonate | 80 | 4.2 | 0 | V-O |
| Sodium 2-fluoro-4-bromotoluene-α-sulfonate | 76 | 3.9 | 0 | V-O |
| Potassium 2-(4-chlorophenyl)ethane-1-sulfonate | 70 | 5.2 | 0 | V-I |
| Lithium 2,2-diphenylethane-1-sulfonate | 66 | 6.2 | 0 | V-I |

EXAMPLE II

This Example is set forth to demonstrate the effect of the additive of this invention at limits of 0.10 parts per hundred parts of the polycarbonate.

In preparing the test specimens for this Example, 100.00 parts of the polycarbonate of Example I is mixed with 0.10 parts of the additives listed in Table 2 employing the same procedure. Test specimens are then molded using the same procedure employed in Example I. The test specimens are subjected to the Bulletin UL-94 test procedure of Example I with the following results:

TABLE 2

| Additive (0.10 parts per hundred) | Flame Out Time Seconds | No. of Drips Per five test bars | UL-94 Rating |
|---|---|---|---|
| CONTROL | 31.6 | 18 | Burning |
| Disodium 1,2-ethanesulfonate | 4.2 | 0 | V-O |
| Sodium 1-decanesulfonate | 8.2 | 3 | V-II |

EXAMPLE III

This Example is set forth to demonstrate the effect of the additive of this invention at limits of 0.20 parts per hundred parts of the polycarbonate.

In preparing the test specimens for this Example, 100.00 parts of the polycarbonate of Example I is mixed with 0.20 parts of the additives listed in Table 3 employing the same procedure. Test specimens are then molded using the same procedure employed in Example I. The test specimens are subjected to the Bulletin UL-94 test procedure of Example I with the following results:

TABLE 3

| Additive (0.20 parts per hundred) | Flame Out time Seconds | No. of Drips Per five test bars | UL-94 Rating |
|---|---|---|---|
| CONTROL | 26 | 13 | Burning |
| Sodium 2,4-dichlorotoluene-$\alpha$-sulfonate | 3.7 | 1 | V-II |
| Sodium 2-bromoethane-1-sulfonate | 2.8 | 2 | V-II |
| Potassium 2-chloroethane-1-sulfonate | 4.8 | 0 | V-O |
| Lithium 2,3,4-trichloro-1-methylnaphthalene-x-sulfonate | 4.6 | 2 | V-II |
| Sodium triphenylmethanesulfonate | 6.6 | 0 | V-I |

EXAMPLE IV

This Example is set forth to demonstrate the effect of the additive of this invention at limits of 0.50 parts per hundred parts of the polycarbonate.

In preparing the test specimens for this Example, 100.00 parts of the polycarbonate of Example I is mixed with 0.50 parts of the additives listed in Table 4 employing the same procedure. Test specimens are then molded using the same procedure employed in Example I. The test specimens are subjected to the Bulletin UL-94 test procedure of Example I with the following results:

TABLE 4

| Additive (0.50 parts per hundred) | Flame Out Time Seconds | No. of Drips Per five test bars | UL-94 Rating |
|---|---|---|---|
| CONTROL | 26 | 13 | Burning |
| Potassium 2,5-dichloro-p-xylene-$\alpha$-sulfonate | 5.4 | 0 | V-I |
| Dipotassium 2,4,6,$\alpha''$-tetrachloro-mesitylene-$\alpha,\alpha'$-disulfonate | 3.3 | 0 | V-O |

EXAMPLE V

This Example is set forth to demonstrate the effect of the additive of this invention at limits of 1.0 parts per hundred parts of the polycarbonate.

In preparing the test specimens for this Example, 100.00 parts of the polycarbonate of Example I is mixed with 1.0 parts of the additives listed in Table 5 employing the same procedure. Test specimens are then molded using the same procedure employed in Example I. The test specimens are subjected to the Bulletin UL-94 test procedure of Example I with the following results:

TABLE 5

| Additive (1.0 parts per hundred) | Flame Out Time Seconds | No. of Drips Per five test bars | UL-94 Rating |
|---|---|---|---|
| CONTROL | 31.6 | 18 | Burning |
| Sodium 2,4-dichlorotoluene-$\alpha$-sulfonate | 3.7 | 1 | V-II |
| Disodium 2,4,5,6-tetrachloro-m-xylene-$\alpha,\alpha'$-disulfonate | 3.6 | 0 | V-O |
| Calcium pentabromotoluene-$\alpha$-sulfonate | 2.8 | 0 | V-O |

EXAMPLE VI

This Example is set forth to show the effect of a known commercially available flame retardant additive.

Example I is repeated except that in place of the additives employed therein, only 1 part decabromodiphenyl ether is used herein. The results obtained upon evaluating five test bars are the same as obtained for the Control shown in Table 1 above.

EXAMPLE VII

This Example is set forth to show the effect of known commercially available flame retardant additives.

A

Example V is repeated except that in place of the additive employed therein, only 1 part 1,2,5,6,9,10-hexabromocyclododecane is used herein. The results obtained upon evaluating five test bars are the same as obtained for the Control shown in Table 5 above.

B

Part A. above is repeated but using 5 weight percent of decabromodiphenyl ether. The results obtained are the same as obtained in Part A. above.

C

Part A. above is repeated but using 10 weight percent of 1,2,5,6,9,10-hexabromocyclododecane. At this level of additive, test bars are rated UL-94 V-II. However, the polycarbonate is badly degraded as evidenced by severe dark streaking of the molded test bars, which degradation does not occur with the additives of the instant invention.

EXAMPLE VIII

Example VII is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted, but with, again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of substituted and unsubstituted aliphatic sulfonic acids and mixtures thereof. The amounts of the additives employed in the practice of this invention may vary from 0.001 to up to that amount which, after further increasing of such an amount, does not materially increase the flame retardant properties of the carbonate polymer. This is generally up to about 10 parts per hundred parts of the aromatic carbonate polymer but may be higher. The amount of the additive to be employed can also be a function of the degree of flame retardancy desired. If non-opaque flame-retardant compositions are desired, the additive employed in the practice of this invention may vary from 0.001 to up to about 2.0 parts per hundred parts of the aromatic carbonate polymer.

As indicated previously, the additive of the instant invention comprises the alkali or alkaline earth metal salts of the substituted and unsubstituted aliphatic sulfonic acids and includes mixtures of these. The name aliphatic designates the carbon atoms directly attached to the ($SO_3M$) radical and even if these carbons carry one or more aromatic radicals, they still are considered chemically, and for the purpose of this categorization, as being aliphatic. While a great number of aliphatic sulfonic acid salts are set forth in the tables of the Examples of the instant invention, these are only a representative sample of the additives of this invention. The sodium, calcium, magnesium, potassium, strontium, lithium, barium, rubidium and cesium salts of other aliphatic and olefinic sulfonic acids can be employed in place of those of the Examples with the same effective flame retardancy being achieved.

In the practice of this invention, the additive is prepared by adding the proper alkaline reagent to the corresponding sulfonic acid in sufficient amount to make the neutral salt. The salt is then recovered and dried.

In the case of the cyano-substituent, it is best to prepare the sulfonic acid by oxidation of the corresponding thiophenol by hydrogen peroxide or organic peracids. The salt is then made as above and recovered accordingly. This technique is also best for the preparation of sulfonic acids with the trichloromethyl substituent.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)-propane), bis(4-hydroxyphenyl)methane, 2,2-bis(4-hydroxyphenyl-3-methylphenyl) propane, 4,4-bis(4-hydroxyphenyl) heptane, 2,2-(3,5,3',5'-tetrachloro-4,4'-dihydroxydiphenyl)propane 2,2-(3,5,3',5'-tetrabromo-4,4'-dihydroxydiphenyl) propane, (3,3'-dichloro-4,4'-dihydroxyphenyl) methane. Other dihydric phenols of the bisphenol type are also available and are disclosed in U.S. Pat. Nos. 2,999,835; 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butyl-ammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

If a non-opaque flame retardant polycarbonate composition is desired, any of the said aromatic polycarbonates can be employed herein having a refractive index in the range of 1.54 to 1.65.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a minor amount of an additive having the following formula:

wherein X is an electron withdrawing radical, M is a metal selected from the group consisting of alkali metals and alkaline earth metals, R' is an aryl radical of 1–2 aromatic rings, R is an aliphatic radical of 1–10 carbon atoms, n and m are integers of from 0–11, s is an integer of from 0–5 and p is an integer of from 1–4; or mixtures thereof with the proviso that when s is 0, R is an aliphatic radical of 2–10 carbon atoms and X is chlorine or bromine.

2. A non-opaque flame retardant aromatic carbonate polymer composition comprising in admixture an aromatic carbonate polymer and from 0.001 to about 2.0 parts per hundred parts of the aromatic carbonate polymer of an additive having the following formula:

wherein X is an electron withdrawing radical, M is a metal selected from the group consisting of alkali metals and alkaline earth metals, R' is an aryl radical of 1–2 aromatic rings, R is an aliphatic radical of 1–10 carbon atoms, n and m are integers of from 0–11, s is an integer of from 0–5 and p is an integer of from 1–4; or mixtures thereof with the proviso that when s is 0, R is an aliphatic radical of 2–10 carbon atoms and X is chlorine or bromine; said aromatic carbonate polymer and additive having a refractive index in the range of 1.54 to 1.65.

3. The composition of claim 1 wherein the electron withdrawing radical is selected from the group consisting of halo-, nitro-, trihalomethyl- and cyano-radicals, and mixtures thereof.

4. The composition of claim 1 wherein the additive is sodium 2-bromoethane-1-sulfonate.

5. The composition of claim 1 wherein the additive is potassium 2-chloroethane-1-sulfonate.

6. The composition of claim 2 wherein the additive is potassium 3,4-dichlorotoluene-α-sulfonate.

7. A shaped article having a refractive index in the range of 1.54 to 1.65 comprising in admixture an aromatic carbonate polymer and from 0.001 to about 2.0 parts per hundred parts of the aromatic carbonate polymer of an additive having the following formula:

wherein X is an electron withdrawing radical, M is a metal selected from the group consisting of alkali metals and alkaline earth metals, R' is an aryl radical of 1-2 aromatic rings, R is an aliphatic radical of 1-10 carbon atoms, n and m are integers of from 0-11, $s$ is an integer of from 0-5 and $p$ is an integer of from 1-4; or mixtures thereof with the proviso that when $s$ is 0, R is an aliphatic radical of 2-10 carbon atoms and X is chlorine or bromine.

8. The shaped article of claim 7 in the form of a sheet.

9. The shaped article of claim 7 in the form of a pellet.

* * * * *